United States Patent Office 3,563,635
Patented Feb. 16, 1971

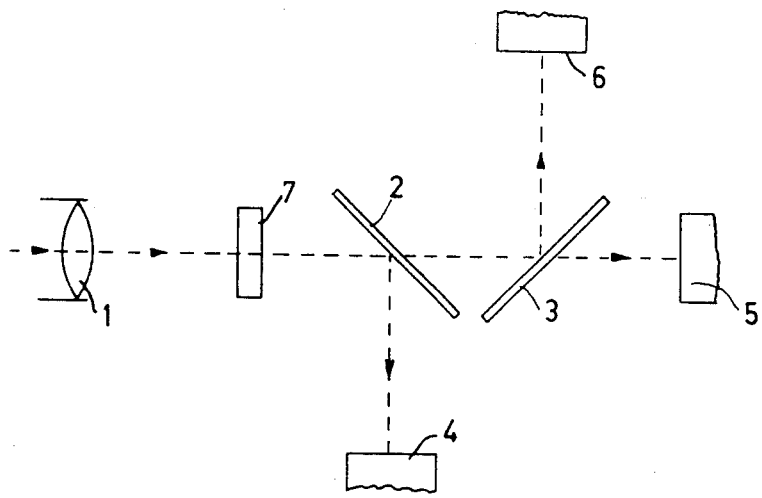

3,563,635
TELEVISION CAMERA HAVING A THICK BIREFRACTIVE PLATE BEFORE THE LIGHT-SPLITTING SYSTEM
Hendrik de Lang, Emmasingel, Eindhoven, Netherlands, assignor, by mesne assignments, to U.S. Philips Corporation, New York, N.Y., a corporation of Delaware
Continuation of application Ser. No. 604,314, Dec. 23, 1966. This application Nov. 12, 1969, Ser. No. 871,577
Claims priority, application Netherlands, Jan. 8, 1966, 6600239
Int. Cl. G02f 1/24
U.S. Cl. 350—171
2 Claims

ABSTRACT OF THE DISCLOSURE

A television camera employing a dichroic mirror light-splitting system and a birefractive plate between the dichroic mirror and an objective lens for projecting an image of a scene in the camera tubes. The birefractive plate is positioned between the objective lens and the dichroic mirror and has a thickness sufficient to modify polarized light from the scene before it is incident on the dichroic mirror.

---

This application is a continuation of application Ser. No. 604,314, filed Dec. 23, 1966, now abandoned.

This invention relates to television cameras including a light-splitting system in the light path between the objective lens and the camera tube, said system comprising at least one dichroic mirror.

A dichroic mirror is built up of a plurality of mirrors having alternately high and low indices of refraction. The thickness of each layer is chosen to be equal to one quarter of the central wave-length of the selected frequency band which has to be reflected by the mirror. As a result of this choice, radiation in the desired band of frequencies is reflected and radiation outside this band is transmitted.

A dichroic mirror has the property that the coefficients of reflection and transmission for light which is polarized in the plane of incidence of the mirror, that is to say light at which the electrical vector oscillates in the plane of incidence, differ from those for light which is polarized at right angles to the plane of incidence.

If the light is not polarized (natural light) the mirror has mean coefficients of reflection and transmission which can be calculated. If, however, the light is polarized, these coefficients differ from the mean values and color shifts occur. These color shifts reach extreme values if the beam incident on the mirror is linearly polarized either in the plane of incidence or at right angles to the plane of incidence of the mirror. The incident light is often polarized indeed, since reflections which occur in the object space (the scene to be picked up) wholly or substantially under Brewster conditions are substantially unavoidable. Reflection under Brewster conditions is referred to if the reflected and transmitted light beams of a beam incident on the boundary layer of two media are at right angles to one another.

An object of the invention is to avoid the aforesaid color shifts. Further objects of the invention will appear as the specification progresses.

In accordance with the invention, a thick bi-refractive plate is included in the light path between the objective lens and the light splitting system. The angle made between the slow or fast axis of the plate and the plane of incidence of the dichroic mirror is preferably approximately 45°.

The invention is bottomed on the discovery that the wavelengths for which the phase difference between the two principal waves of a bi-refractive plate, except a whole multiple of $2\pi$ has the same value, lie closer to one another as the plate is thicker. It is to be understood that the two principal waves of a bi-refractive plate are the so-called fast wave and the slow wave.

It has been found that, if the incident light has a spectral distribution of a continuous character, the distribution of the light energy over the components polarized at right angles to the plane of incidence and in the plane of incidence may be made sufficiently uniform if the double refraction is at least a few wave-lengths. This holds good irrespectively of the state of polarization of the incident light, which can and may be polarized either elliptically, or circularly, or linearly.

Preferably, the double refraction is chosen to be much greater than a few wave-lengths. First, the operation is thus improved still further, and second, technical advantages result therefrom, since the the manufacture is simplified as the birefractive plate is thicker. A quartz plate of 5 mm. thick, cut in parallel with the main axis, has a double refraction equal to 100 wave-lengths of light having a wave-length of 0.5 micron (green light).

The invention will now be described with reference to the accompanying drawing, showing one embodiment of a color television camera according to the invention.

The light originating from the scene impinges through an objective lens 1 on the light splitting system comprising dichroic mirrors 2 and 3. The dichroic mirror 2 reflects the red component of the light and transmits the blue and green components. The dichroic mirror 3 reflects the blue component and transmits the green one. The camera tubes 4, 5 and 6 thus receive red, green and blue light, respectively.

A thick bi-refractive plate 7 is arranged between the objective lens 1 and the light splitting system 2, 3 so that the principal section of the plate is at an angle of 45° with the plane of the dichroic mirror 2.

The state of polarization of the polarized light originating from the scene and striking the plate 7 is modified by this plate. This modification greatly depends upon the wave-length of the light with the result that in the spectral region of the light employed, the light energy is on the average distributed substantially uniformly over the vibrations at right angle to the plane of incidence and in the plane of incidence.

As previously mentioned, the camera according to the invention affords the advantage that its operation is substantially independent of the state of polarization of the incident light. This advantage does not hold good if a λ/4 plate were used. Such a plate is effective only for linearly polarized light of one determined wave-length. For incident light which is polarized circularly, the effect of a λ/4 plate is even opposite to what is desired.

I claim:

1. In a television camera, a light-splitting system in the light path between an objective lens and a camera tube, said system comprising at least one dichroic mirror and a birefractive plate capable of modifying the state of polarized light received from a scene in the light path between the objective lens and the mirror.

2. A television camera as claimed in claim 1, in which the angle made between the slow or fast axis of the plate and the plane of incidence of the dichroic mirror is substantially 45°.

References Cited

UNITED STATES PATENTS

| | | | |
|---|---|---|---|
| 2,182,142 | 12/1939 | Ball et al. | 350—173 |
| 2,441,049 | 5/1948 | West | 350—157 |
| 2,809,570 | 10/1957 | Dearing et al. | 95—12.2 |

OTHER REFERENCES

Smartt et al., Birefringence of Quartz and Calcite, 49(7) J.O.S.A., 710–712, July (1959).

Shurcliff et al., Polarized Light, 42–49, 54–63, (1964).

DAVID SCHONBERG, Primary Examiner

J. W. LEONARD, Assistant Examiner

U.S. Cl. X.R.

95—12.2; 178—5.4; 350—157

PO-1050
(5/69)

UNITED STATES PATENT OFFICE
CERTIFICATE OF CORRECTION

Patent No. 3,563,635                    Dated    February 16, 1971

Inventor(s)  HENDRIK DE LANG

It is certified that error appears in the above-identified patent and that said Letters Patent are hereby corrected as shown below:

Column 2, lines 57 and 60, change "$\lambda/4$" to -- $\dfrac{T}{4}$ --;

Column 2, and Column 3, rewrite Claims 1 and 2 as

--Claim 1

In a television camera, a light-splitting system in the light path between an objective lens and a camera tube, said system comprising at least one dichroic mirror having a given plane of incidence and a thick birefractive plate in the light path between the objective lens and the mirror, the thickness of the birefractive plate being sufficient to provide double refraction much greater than a few wave-lenghts of radiation incident on the dichroic m: said birefractive plate having a slow and a fast axis one of which forms an angle of approximately 45° with the plane of incidence of the dichroic mirror and both of which are substantially perpendicular to the light path.--

Signed and sealed this   10th   day of August   197

(SEAL)
Attest:

EDWARD M. FLETCHER, JR.                WILLIAM E. SCHUYLER,
Attesting Officer                       Commissioner of Paten